(12) United States Patent
Frederick et al.

(10) Patent No.: US 6,513,843 B1
(45) Date of Patent: Feb. 4, 2003

(54) PEDESTRIAN PROTECTION LEG SPOILER

(75) Inventors: Gregory Stanley Frederick, Sterling Heights, MI (US); Peter John Schuster, Warwickshire (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,834

(22) Filed: Feb. 21, 2002

(51) Int. Cl.$^7$ .......................... B60R 21/34; B61F 19/10
(52) U.S. Cl. .......................................... 293/36; 293/120
(58) Field of Search ............................. 293/15, 36, 37, 293/120

(56) References Cited

U.S. PATENT DOCUMENTS

| | | | |
|---|---|---|---|
| 1,566,681 A | | 12/1925 | Moore |
| 3,884,516 A | * | 5/1975 | Gallion et al. ............... 293/120 |
| 3,917,332 A | | 11/1975 | Puleo |
| 3,992,047 A | | 11/1976 | Barenyi et al. |
| 4,131,308 A | * | 12/1978 | Holka et al. ............... 296/180.5 |
| 4,482,180 A | * | 11/1984 | Huber et al. ................ 293/120 |
| 4,492,398 A | * | 1/1985 | Peter ........................... 293/120 |
| 4,778,212 A | | 10/1988 | Tomforde |
| 4,826,226 A | * | 5/1989 | Klie et al. ................... 293/120 |
| 5,139,304 A | | 8/1992 | Tajiri |
| 6,089,628 A | | 7/2000 | Schuster |
| 6,365,384 B1 | * | 4/2002 | Kemp et al. ................ 293/120 |
| 6,394,512 B1 | * | 5/2002 | Schuster et al. .............. 293/15 |
| 6,460,909 B2 | * | 10/2002 | Mansoor et al. ............ 293/120 |

FOREIGN PATENT DOCUMENTS

EP 1-065-108 A2 3/2001

* cited by examiner

Primary Examiner—D. Glenn Dayoan
Assistant Examiner—Paul Chenevert
(74) Attorney, Agent, or Firm—Gary A. Smith

(57) ABSTRACT

A bumper system for reducing injury to a pedestrian struck by an automotive vehicle by lessening the likelihood of pedestrian knee joint damage or underbody entrapment while minimizing the point load applied to the lower leg. The bumper assembly includes a bumper beam having a front surface, cushioning material such as energy absorbent high-density foam disposed on the front surface of the bumper beam, and a pedestrian protection leg spoiler secured to the bumper beam and extending downwardly and forwardly therefrom to position the leading edge of the leg spoiler below the cushioning material. The cushioning material absorbs energy of the initial impact with the leg in the vicinity of the knee, and the leg spoiler contacts the leg at a lower position. The leg spoiler has stiffness characteristics such that the impact load applied by the leg to the leading edge causes the leg spoiler to bend rearward in the manner of a cantilever beam. As it bends, the leg spoiler absorbs the impact load until reaching a maximum deflection, whereupon the leg spoiler sweeps the lower leg in the direction of vehicle travel to prevent pedestrian underbody entrapment. The bumper assembly further includes an aerodynamic fascia disposed in front of the leg spoiler to improve the airflow around the bumper assembly. The fascia may also cover the front of the cushioning material and may include a grille.

11 Claims, 3 Drawing Sheets

PEDESTRIAN PROTECTION LEG SPOILER

BACKGROUND OF INVENTION

The present invention concerns the front bumpers of automotive vehicles and expressly relates to a device for lessening point load during vehicle impact with a pedestrian and reducing the likelihood of knee injury and pedestrian underbody entrapment.

Automotive vehicle bumper systems have long been designed primarily to absorb impact forces generated during collisions with other vehicles and/or with fixed objects. Bumper systems are typically constructed of a high strength plastic mounted to a metal bumper beam and/or frame. This bumper system typically extends across the front and rear of the vehicle and serves as an absorber and deflector upon impact.

Previous bumper designs have been effective in vehicle-to-vehicle collisions, but limitations in the design are realized during pedestrian impacts. In some vehicle collisions with upright (standing, walking, or running) pedestrians, the bumper makes contact with the pedestrian's leg in the vicinity of the knee and there is a tendency for the pedestrian's foot to remain planted on the ground. As the vehicle continues to move forward, the bumper forces the pedestrian's lower leg to rotate about the foot or ankle and the bumper overrides the lower leg, resulting in potentially severe knee injury and/or the pedestrian being drawn under the vehicle.

U.S. Pat. No. 6,089,628 teaches a vertically movable stiffener for reducing or eliminating pedestrian leg injuries during a collision. The stiffener is located immediately below the bumper and extends across substantially the full width of the bumper. The stiffener is raised close to the underside of the bumper when the vehicle is operating at lower speeds so that the vehicle maintains a relatively large approach angle. When the vehicle's speed increases, the stiffener moves downward to a height at which it will make contact with a lower part of the leg during a pedestrian impact and hinder lateral knee bending and pedestrian underbody entrapment. The movable stiffener is rigid and does not yield significantly at the point where it impacts the pedestrian's lower leg, thus generating relatively high point loads. The deployable stiffener is also relatively complex and expensive to manufacture and install on a vehicle. Therefore, there is a need in the art to provide a bumper assembly that can be more simply and inexpensively executed, and that allows more freedom of design while reducing point load forces imparted to the pedestrian's lower leg upon impact.

SUMMARY OF INVENTION

The present invention provides a bumper system for reducing injury to a pedestrian struck by an automotive vehicle by lessening the likelihood of pedestrian knee injury and underbody entrapment and reducing the point load applied to the lower leg.

These objectives are achieved by a bumper assembly comprising a bumper beam having a front surface, cushioning material such as energy absorbent high-density foam disposed on the front surface of the bumper beam, and a pedestrian protection leg spoiler secured to the bumper beam and extending downwardly and forwardly therefrom to position the leading edge of the leg spoiler below the cushioning material. The cushioning material absorbs energy of the initial impact with the leg in the vicinity of the knee, and the leg spoiler contacts the leg at a lower position. The leg spoiler has stiffness characteristics such that the impact load applied by the leg to the leading edge causes the leg spoiler to bend rearward in the manner of a cantilever beam. As it bends, the leg spoiler absorbs the impact load until reaching a maximum deflection, whereupon the leg spoiler sweeps the lower leg in the direction of vehicle travel to prevent pedestrian underbody entrapment and excessive lateral knee bending.

According to another feature of the invention, the bumper assembly further comprising an aerodynamic fascia disposed in front of the leg spoiler to improve the airflow around the bumper assembly. The fascia may also cover the front of the cushioning material and may include a grille.

DETAILED DESCRIPTION

Figure 1:
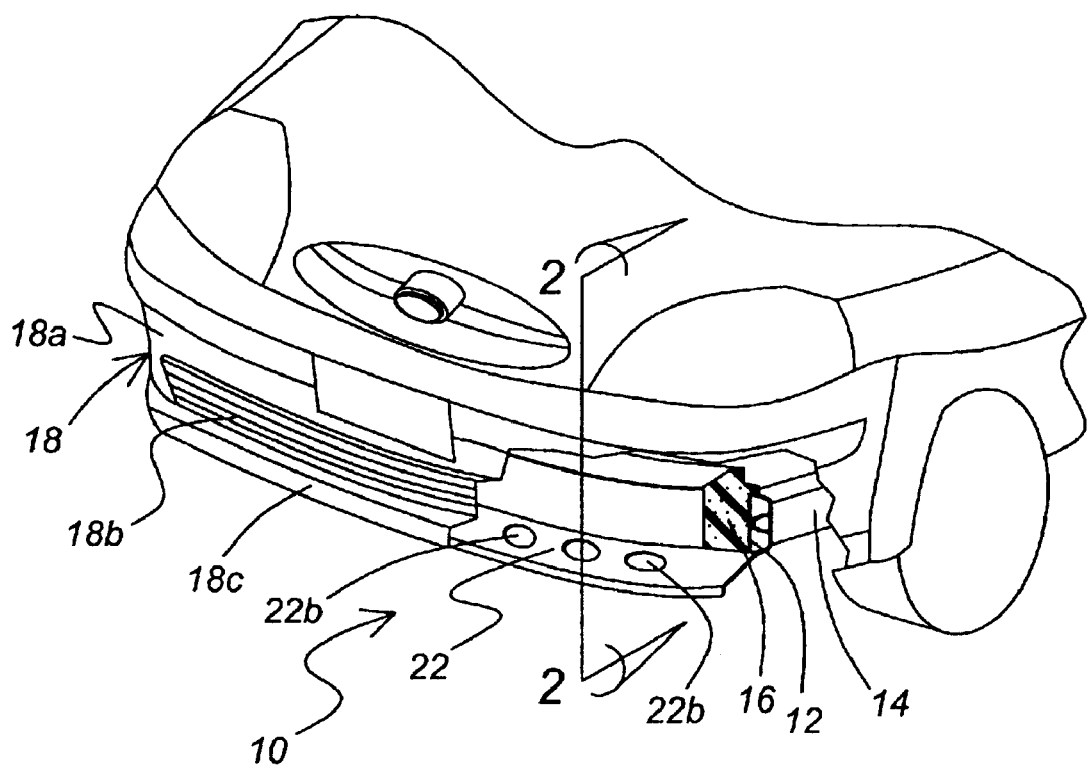
FIG. 1 is a partial perspective view of a motorized vehicle equipped with a bumper system according to the present invention.
Figure 2:
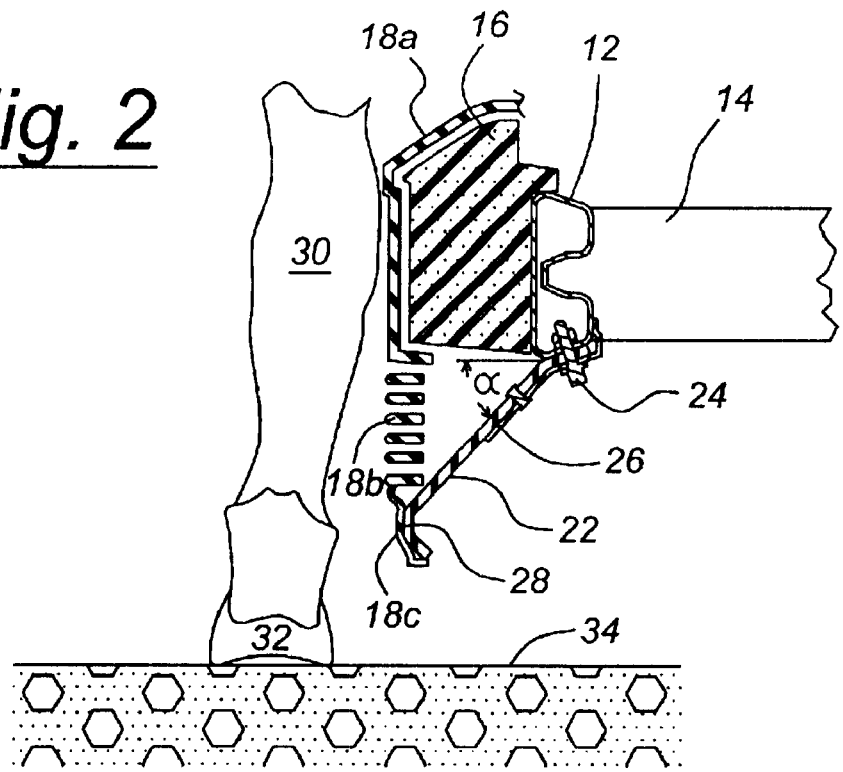
FIG. 2 is a cross-sectional view taken along line 2—2 of FIG. 1, and showing the bumper system making initial contact with a pedestrian's leg.

A motorized vehicle shown in FIG. 1 is equipped with a front bumper system 10 according to the present invention. The bumper system 10 includes a steel bumper beam 12 mounted to the vehicle's frame rails 14, a cushioning material 16 such as high-density foam, a multiple density foam absorber, or an injection molded plastic absorber secured to the front surface of the bumper beam 12, and a front fascia 18 preferably formed of a plastic material. The front fascia 18 comprises an upper fascia 18a, a grille 18b, and a lower fascia 18c, and may be fabricated in a single piece or in multiple pieces as necessary for manufacturing and assembly purposes. In frontal impact collisions with other vehicles or fixed objects, the impact load is transferred through the thin wall of the fascia 18 and the cushioning material 16 to the bumper beam 12 and then to the frame rails 14. Crush cans (not shown) or other appropriate energy absorbing structures may be located between the bumper beam 12 and the frame rails 14 to deform in a severe collision and partially absorb the kinetic impact energy as it is transferred through the bumper system and into the vehicle frame. The cushioning material 16 provides support to the upper fascia 18a and permits greater design freedom, as styling changes to the upper fascia 18a will not necessarily result in hard tool changes to the bumper beam 12. Fascia 18 provides an aerodynamic treatment to the entire bumper system, improving the airflow over and around the front of the vehicle to reduce drag, and/or create downforce. The invention bumper system 10 further comprises a pedestrian protection leg spoiler 22 extending transversely across substantially the entire width of the underside of the bumper beam 12. Spoiler 22 is rigidly secured along its uppermost/rearmost edge to the bumper beam 12 by fasteners 24 (see FIG. 2) or other appropriate means, such as welding. Leg spoiler 22 is made of a strong yet flexible material such as high-strength plastic, steel, or a composite, and may include one or more reinforcements 26 extending across some or all of the width of the spoiler 22. The reinforcements 26 may also serve as mounting brackets for securing the leg spoiler 22 to the bumper beam 12, as shown. Leg spoiler 22 projects downward and forward from bumper beam 12 at an angle α to the horizontal so that a forwardmost or leading edge of the spoiler is positioned approximately below the front edge of the cushioning material 16. The leading edge of the spoiler bends or curves downwardly to form a lip 28 having a substantially vertically disposed section. It is alternatively possible for the lip 28 to bend or curve upward. As best seen in FIG. 2, lower fascia 18c covers the leading edge and, together with grille 18b, substantially hides the spoiler 22 from view and improves the aerodynamics of the vehicle. If necessary for cooling or aerodynamic reasons, one or more windows 22b (see FIG. 1) may be formed in the leg spoiler 22 to allow air to pass through when the vehicle is in motion.

Figure 3:
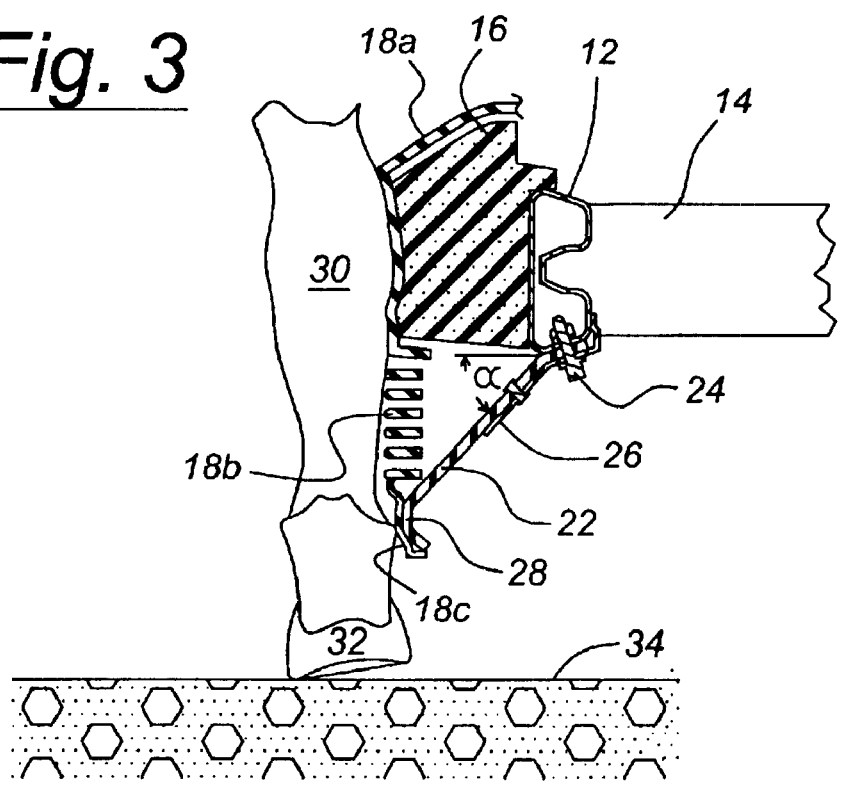
FIG. 3 is a view similar to FIG. 2 shortly after initial contact and showing the pedestrian protection leg spoiler contacting the leg.

When a vehicle front end strikes an upright pedestrian, the initial contact is most likely to be between the bumper and the lower leg 30 of the pedestrian. See FIG. 2. Depending upon the size and posture of the pedestrian relative to the bumper, upper fascia 18a contacts the leg 30 approximately in the knee area and the impact load begins to be absorbed by the cushioning material 16 as it compresses. As seen in FIG. 3, the lower fascia 18c makes contact further down on the leg 30 approximately simultaneously with or just after the bumper makes contact, depending upon the configuration of the leg spoiler 22 and the relative geometry of the leg to the bumper. The load at the lower point of contact is transferred to the leg spoiler 22 behind the lower fascia 18c. The vertically projecting lip 28 provides additional contact surface area with the leg 30 at the lower point of contact to decrease the point load and therefore reduce the likelihood of localized leg trauma.

Figure 4:
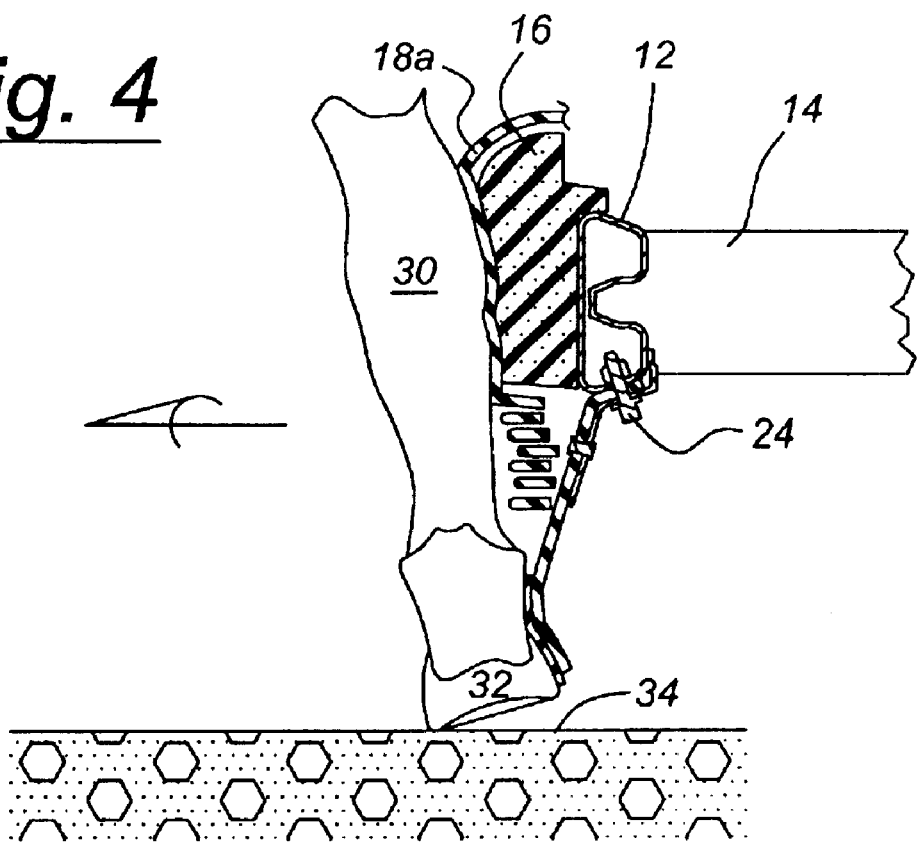
FIG. 4 is a view taken just after FIG. 3 and showing the pedestrian protection leg spoiler in a fully deflected condition.

As the vehicle continues to move toward the pedestrian, the foot 32 tends to remain planted on the ground 34 so that the bumper forces the lower leg 30 to rotate counterclockwise (see FIG. 4). The load applied to leg spoiler 22 by leg 30 increases and the spoiler flexes rearward, bending in the manner of a cantilever beam so that elastic deformation of the spoiler absorbs some of the kinetic energy of the impact. As the leg spoiler 22 bends rearward it assumes a more vertical orientation and its leading edge slides downward on the leg 30 until the spoiler reaches a maximum deflection. At maximum deflection, the combination of the force applied to the leg 30 by the spoiler 22 and the lower point of application of the force on the leg results in the spoiler sweeping the lower leg and foot 32 in the direction of vehicle travel (to the left as viewed in FIGS. 2–4). As a result, the vehicle does not overrun the lower leg 30 and excessive lateral knee bend angle and pedestrian underbody entrapment are avoided.

Deflection of the spoiler 22 during the impact effectively moves the point of contact between the spoiler and the leg downward on the leg to a position low enough to sweep the leg out from beneath the bumper and so avoid knee injury. Accordingly, the undeflected (static) position of the spoiler can be higher than is possible with a fixed, rigid leg spoiler, which must extend quite close to the ground in order to contact the leg at a point low enough to effectively prevent knee injury. The higher position of the invention leg spoiler results in it having less influence on the vehicle's front-end styling, and yielding increased ground clearance and approach angle when compared with other design alternatives.

The stiffness characteristics of the leg spoiler 22 are determined by design factors such as the material or materials from which it is formed, the cross-sectional area (which may vary over the length and/or width of the spoiler), and the spoiler's geometry relative to the bumper (its length, the angle α, and the height and horizontal position of leading edge, for example). The stiffness characteristics are designed so that the spoiler 22 yields enough to cushion impact and spread the load over a greater area of the leg 30, but at full deflection the spoiler applies sufficient force to the leg to prevent excessive lateral knee bending and pedestrian underbody entrapment.

As the leg spoiler 22 bends rearward, the lower end of the spoiler flattens against the surface of the lower leg 30 so that the area of contact increases and the impact force is distributed over a greater area of the leg. This reduces the likelihood of localized leg trauma as the spoiler 22 is exerting the maximum amount of force on the leg 30 and sweeping the leg out from under the bumper. The spoiler 22 may be designed to be more flexible adjacent the leading edge and increase in stiffness towards over its length in order to maximize this cushioning effect.

While the best modes for carrying out the invention have been described in detail, those familiar with the art to which this invention relates will recognize various alternative designs and embodiments for practicing the invention as defined by the appended claims.

What is claimed is:

1. A bumper assembly for reducing injury to a pedestrian struck by an automotive vehicle, the bumper assembly comprising:

a bumper beam having a front surface;

cushioning material disposed on the front surface of the bumper beam; and a pedestrian protection leg spoiler secured to the bumper beam and extending downwardly and forwardly therefrom to position a leading edge of the leg spoiler below the cushioning material, the leg spoiler having stiffness characteristics such that a horizontal impact load applied by a leg of the pedestrian to the leading edge of the leg spoiler causes the leg spoiler to bend downward and rearward about a generally horizontal bending axis in the manner of a cantilever beam and thereby absorb the impact load until reaching a maximum deflection, whereupon the leg spoiler sweeps the lower leg in the direction of vehicle travel to prevent excessive lateral knee bending and pedestrian underbody entrapment.

2. The bumper assembly as described in claim 1 further comprising an aerodynamic fascia disposed in front of the leg spoiler.

3. The bumper assembly as described in claim 2 wherein the aerodynamic fascia comprises a grille.

4. The bumper assembly as described in claim 1 wherein the cushioning material comprises energy absorbent high-density foam.

5. The bumper assembly as described in claim 1 wherein the leg spoiler comprises a lip extending substantially vertically from the leading edge.

6. The bumper assembly as described in claim 1 wherein the leg spoiler is secured to the bumper beam with at least one bolt.

7. A bumper assembly for an automotive vehicle comprising:

a bumper beam having a front surface;

cushioning material disposed on the front surface of the bumper beam;

a pedestrian protection leg spoiler secured to the bumper beam and extending downwardly and forwardly therefrom to position a leading edge of the leg spoiler below the cushioning material, the leg spoiler having stiffness characteristics such that a horizontal impact load applied by a leg of the pedestrian to the leading edge of the leg spoiler causes the leg spoiler to bend downward and rearward about a generally horizontal bending axis in the manner of a cantilever beam and thereby absorb the impact load until reaching a maximum deflection, whereupon the leg spoiler sweeps the lower leg in the direction of vehicle travel to prevent excessive lateral knee bending and pedestrian underbody entrapment; and an aerodynamic fascia disposed in front of the leg spoiler.

8. The bumper assembly as described in claim 7 wherein the leg spoiler comprises a lip extending substantially vertically from the leading edge.

9. The bumper assembly as described in claim 7 wherein the cushioning material comprises energy absorbent high-density foam.

10. The bumper assembly as described in claim 7 wherein the leg spoiler is secured to the bumper beam with at least one bolt.

11. The bumper assembly as described in claim 7 wherein the fascia conceals the pedestrian protection leg spoiler and the bumper beam from view.

\* \* \* \* \*